US012769900B2

(12) United States Patent
Mao et al.

(10) Patent No.: US 12,769,900 B2
(45) Date of Patent: Oct. 20, 2026

(54) THERMAL ANALYSIS METHOD FOR CERAMIC MATRIX COMPOSITE (CMC) TURBINE VANE CONSIDERING MICRO-WOVEN STRUCTURE AND CHANGE OF DIRECTION OF FIBER BUNDLES

(71) Applicant: NANJING UNIVERSITY OF AERONAUTICS AND ASTRONAUTICS, Nanjing (CN)

(72) Inventors: Junkui Mao, Nanjing (CN); Zecan Tu, Nanjing (CN); Chenwei Zhao, Nanjing (CN); Xinyu Wu, Nanjing (CN); Xingsi Han, Nanjing (CN); Zhenzong He, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 1126 days.

(21) Appl. No.: 17/794,608

(22) PCT Filed: Sep. 10, 2021

(86) PCT No.: PCT/CN2021/117611
§ 371 (c)(1),
(2) Date: Jul. 21, 2022

(87) PCT Pub. No.: WO2022/078130
PCT Pub. Date: Apr. 21, 2022

(65) Prior Publication Data

US 2023/0061642 A1 Mar. 2, 2023

(30) Foreign Application Priority Data

Oct. 12, 2020 (CN) ........................ 202011085019.2

(51) Int. Cl.
*G06F 30/15* (2020.01)
*G06F 30/23* (2020.01)
(Continued)

(52) U.S. Cl.
CPC .............. *G06F 30/15* (2020.01); *G06F 30/23* (2020.01); *G06F 2113/26* (2020.01); *G06F 2119/08* (2020.01)

(58) Field of Classification Search
CPC ...... G06F 30/15; G06F 30/23; G06F 2119/08; G06F 2113/26
See application file for complete search history.

(56) References Cited

U.S. PATENT DOCUMENTS

| | | | | |
|---|---|---|---|---|
| 5,403,790 A * | 4/1995 | Claar | .................... | C04B 35/652 501/87 |
| 5,939,216 A * | 8/1999 | Kameda | .................. | D04C 1/06 428/323 |

(Continued)

FOREIGN PATENT DOCUMENTS

| | | |
|---|---|---|
| CN | 106250575 A | 12/2016 |
| CN | 110909495 A | 3/2020 |
| CN | 112149236 A | 12/2020 |

OTHER PUBLICATIONS

Zecan Tu, Junkui Mao, Hua Jiang, Xingsi Han, Zhenzong He, "Numerical method for the thermal analysis of a ceramic matrix composite turbine vane considering the spatial variation of the anisotropic thermal conductivity", pp. 436-452, 2017 (Year: 2017).*

(Continued)

*Primary Examiner* — Kibrom K Gebresilassie
(74) *Attorney, Agent, or Firm* — JCIPRNET

(57) ABSTRACT

A thermal analysis method for a ceramic matrix composite (CMC) turbine vane considering a micro-woven structure and a change of direction of fiber bundles: obtaining geometric characteristics of the fiber bundles of the internal (Continued)

woven structure of the CMC; establishing a micro-model of warp yarns and weft yarns of the woven structure and a CMC matrix; constructing a woven structural CMC turbine vane model with a micro-structure periodic width in a vane height direction; assigning an anisotropic thermal conductivity matrix varying with a vane profile; performing meshing; performing finite element calculation of a temperature field; and obtaining calculation results of the temperature field of the woven structural CMC turbine vane model, comparing the calculation results with calculation results based on a homogenization thermal analysis method for an equivalent thermal conductivity for analysis, and extracting and analyzing fluctuation characteristics of the temperature field of the woven structural CMC turbine vane.

6 Claims, 4 Drawing Sheets

(51) Int. Cl.
*G06F 113/26* (2020.01)
*G06F 119/08* (2020.01)

(56) References Cited

U.S. PATENT DOCUMENTS

| | | | | |
|---|---|---|---|---|
| 2018/0171805 | A1* | 6/2018 | Freeman | F01D 5/282 |
| 2018/0179906 | A1 | 6/2018 | Schetzel et al. | |

OTHER PUBLICATIONS

Long-Miao, Chen, "Study on Thermal Property of Composite Barrel", Nanjing University of Science & Technology, Ph. D. Dissertation, Oct. 2005, 149 pages.
Hongli, Zhao, "Finite Element Analysis of the Temperature Field for Carbon/Carbon Braided Composites", A Thesis Submitted for the Application of the Project Master's Degree, Nov. 2012, 68 pages.
Nita, Kozo, et al., "Experimental and Numerical Study on Application of a CMC Nozzle for High Temperature Gas Turbine", Mechanical Properties and Performance of Engineering Ceramics and Composites VII, 10 pages.
Rui, Xu, "Numerical Model for Predicting the Thermal Conductivity of Unidirectional Fiber Reinforced Ceramic Materials", Nanjing University of Aeronautics and Astronautics the Graduate School College of Energy and Power Engineering, Dec. 2013, 125 pages.
Tu, Zecan, et al., "Numerical Method for the Thermal Analysis of a Ceramic Matrix Composite Turbine Vane Considering the Spatial Variation of the Anisotropic Thermal Conductivity", Applied Thermal Engineering, vol. 127, 2017, pp. 436-452, 17 pages.
Xiao, Zhao, "Investigation on Film Cooling of Braided Composites Considering Film Hole and Braided Structure Interference", A Thesis in Aerospace Propulsion Theory and Engineering, Mar. 2018, 126 pages.
Zecan, Tu, "Investigation of CMC's Thermal Conduction Mechanism and Its Application in Thermal Analysis for Turbine Vane", Aerospace Propulsion Theory and Engineering, Apr. 2018, 163 pages.
International Search Report and Written Opinion received in connection with corresponding International Patent Application No. PCT/CN2021/117611, dated Dec. 8, 2021, 10 pages.

* cited by examiner

THERMAL ANALYSIS METHOD FOR CERAMIC MATRIX COMPOSITE (CMC) TURBINE VANE CONSIDERING MICRO-WOVEN STRUCTURE AND CHANGE OF DIRECTION OF FIBER BUNDLES

CROSS REFERENCE TO RELATED APPLICATION

This application claims priority to Chinese Patent Application No. CN202011085019.2, filed with the China National Intellectual Property Administration (CNIPA) on Oct. 12, 2020 and entitled "THERMAL ANALYSIS METHOD FOR CERAMIC MATRIX COMPOSITE (CMC) TURBINE VANE CONSIDERING MICRO-WOVEN STRUCTURE AND CHANGE OF DIRECTION OF FIBER BUNDLES", which is incorporated herein by reference in its entirety.

TECHNICAL FIELD

The present disclosure belongs to the technical field of engineering thermophysics, and in particular to a thermal analysis method for a ceramic matrix composite (CMC) turbine vane considering a micro-woven structure and a change of direction of fiber bundles.

BACKGROUND ART

At present, high thrust-to-weight ratio aeroengines have increasingly higher requirements for the heat resistance of hot end components such as turbine vanes, and increasingly complex cooling structures and limited amount of cool air have brought huge challenges to the thermal protection of turbine vanes. Therefore, high temperature resistant materials represented by the ceramic matrix composite (CMC) toughened by woven structural fibers have received more and more attention and applications.

The "Integrated High Performance Turbine Engine Technology (IHPTET)" program and the "Ultra Efficient Energy Technology (UEET)" program led by the U.S. government, the "Research and Development of Environmentally Compatible Propulsion System for Next Generation Supersonic Transport (ESPR)" program led by the Japanese government, and the "National Technical Foundation for 2007-2011 years" program lead by the Russian government have special funds for the research and development of CMC hot end components. The Leap-X engine designed and manufactured by CFM company and assembled on COMAC C919 also uses the CMC for its core hot end components such as a high-pressure turbine first-stage outer ring, a low-pressure turbine guide vane and a tail cone, making the engine more effectively reduce noise and improve propulsion efficiency.

The woven structural CMC is to interweave and arrange fiber bundles in space to form a fiber toughener, which is then combined with a matrix material. Due to the anisotropy of the internal toughened fiber itself and the difference in thermal conductivity between the fiber and the matrix, the overall thermal conductivity of the material often exhibits anisotropy. At the same time, since the geometric dimensions of the fiber bundles are close to those of thin-walled hot end components such as turbine vanes, periodic variation characteristics of the woven structure will inevitably affect distribution characteristics of a temperature field of the turbine vane. Therefore, it is necessary to establish a thermal analysis model for a woven structural CMC turbine vane.

At present, most of the thermal analysis of composite components uses the homogenization thermal analysis method based on the anisotropic equivalent thermal conductivity, that is, a calculation model is simplified to a homogeneous model without considering the characteristics of the woven structure of CMC toughened fibers. During calculation, the macroscopic equivalent thermal conductivity in three different coordinate directions under a global coordinate system is set to complete the calculation of the temperature field. For example, Zhao Hongli et al. (Zhao Hongli. Finite element analysis of temperature field of carbon/carbon woven composites [D]. Jinan: Qilu University of Technology, 2012) and Chen Longmiao (Chen Longmiao. Study on thermal performance of composite material barrel Mt Nanjing: Nanjing University of Science & Technology, 2005) respectively use this method to perform numerical simulation research on the temperature field of the rocket engine tail nozzle and composite barrel of carbon/carbon woven composites. Nita et al. (Nita K, Okita Y, Nakamata C. Experimental and numerical study on application of a CMC nozzle for high temperature gas turbine. Mechanical Properties and Performance of Engineering Ceramics and Composites VII, 2013, 315-324) carry out experimental and numerical simulation studies on the CMC turbine vane. First, a high-temperature gas cascade test is performed on the vane, and the temperature of the vane wall surface is measured with an infrared thermal imager. Then, in the numerical simulation, the test results are used as the boundary condition, anisotropic physical properties of the CMC material are set using the overall homogenization method, and the thermal stress of the CMC turbine vane is analyzed in detail. Xu Rui et al. (Xu Rui. Calculation method of thermal conductivity of unidirectional fiber-reinforced ceramic matrix composites Mt Nanjing: Nanjing University of Aeronautics and Astronautics, 2013) study the effect of anisotropy and dispersion of the thermal conductivity on temperature field distribution of the turbine vane for the MarkII turbine vane. The vane is also studied by the overall homogenization thermal analysis method, that is, the macroscopic equivalent thermal conductivity of the turbine vane in three directions is given, and the law of a high-temperature area of the vane with the thermal conductivity is obtained. Zecan Tu et al. (Z. Tu, J. K. Mao, H. Jiang et al. Numerical method for the thermal analysis of a ceramic matrix composite turbine vane considering the spatial distribution of the anisotropic thermal conductivity, Applied Thermal Engineering, 2017, 127:436-452) further considers spatial variation of the anisotropic thermal conductivity with the vane profile on the basis of the above research, a more accurate thermal analysis method for the CMC turbine vane is established.

However, the above thermal analysis method cannot reflect the influence of the internal woven structure of the material on the temperature field of the turbine vane because the characteristics of the micro-woven structure are homogenized. According to Zhao Xiao et al. (Zhao Xiao. Study on film cooling of composite materials considering interference of film pores and woven structure [D]. Nanjing: Nanjing University of Aeronautics and Astronautics, 2017: 9-120), the overall homogenization calculation method cannot obtain the temperature information of CMC fluctuation due to the fiber weave structure. The modeling method based on the full-size micro-woven structure can more accurately restore the temperature field of the CMC, grasp the internal heat transfer mechanism of the CMC hot end components, and help to establish a refined thermal analysis method for the CMC hot end components.

Therefore, it is necessary to establish a thermal analysis model for the CMC turbine vane based on the micro-woven structure on the basis of obtaining the micro-structure characteristics of the material, so as to make up for the defect of the homogenization thermal analysis method for simulation distortion of temperature field fluctuation information, and improve the estimation accuracy of the temperature field of the woven structural CMC turbine vane.

SUMMARY

An objective of the present disclosure is to provide a thermal analysis method for a CMC turbine vane considering a micro-woven structure and a change of direction of fiber bundles, so as to solve the problems in the prior that since the micro-woven structure is homogenized, the method cannot obtain fluctuation characteristics of a temperature field caused by the woven structure, and cannot meet the requirements of high-precision thermal analysis of the woven structural CMC turbine vane.

To achieve the above objective, the present disclosure adopts the following technical solutions.

A thermal analysis method for a CMC turbine vane considering a micro-woven structure and a change of direction of fiber bundles includes the following steps:

- step I, obtaining geometric characteristics of the fiber bundles of the internal woven structure of the CMC based on an scanning electron microscope (SEM);
- step II, according to the geometric characteristics obtained in step I, combined with an actual thickness of the CMC turbine vane, establishing a micro-model of warp yarns and weft yarns of the woven structure and a CMC matrix;
- step III, according to geometric periodic characteristics of the woven structure, constructing a woven structural CMC turbine vane model with a micro-structure periodic width in a vane height direction;
- step IV, for the woven structural CMC turbine vane model constructed in step III, assigning an anisotropic thermal conductivity matrix varying with a vane profile;
- step V, meshing the woven structural CMC turbine vane model constructed in step III;
- step VI, performing finite element calculation of a temperature field on the woven structural CMC turbine vane model; and
- step VII, obtaining calculation results of the temperature field of the woven structural CMC turbine vane model, comparing the calculation results with calculation results based on a homogenization thermal analysis method for an equivalent thermal conductivity for analysis, and extracting and analyzing fluctuation characteristics of the temperature field of the woven structural CMC turbine vane.

In step I, the geometric characteristics may include section size characteristics and a fiber bundle spacing.

In step III, in the woven structural CMC turbine vane model, a direction of the warp yarns may change along the vane profile, and the weft yarns may be woven around the warp yarns.

In step III, first, a warp yarn section may be swept along a characteristic line of the vane profile to establish warp yarn characteristics at different thickness positions, then a weft yarn section may be interleaved around the warp yarns in the vane height direction, and a spacing between the warp yarn and the weft yarn may be a fiber bundle spacing.

In step IV, the anisotropic thermal conductivity matrix of the warp yarns and the weft yarns may vary with space of the vane profile through curvilinear coordinates in a Comsol-Multiphysics software mathematics module, local curvilinear coordinates varying with the vane profile may be set for the warp yarns and the weft yarns inside the vane, and then based on the curvilinear coordinates, an anisotropic thermal conductivity in three directions of a local area may be assigned to characterize spatial variation characteristics of the anisotropic thermal conductivity matrix.

In step V, local mesh densification may be performed in a dense area of the fiber bundles and an area at a junction of the fiber bundles and the CMC matrix.

In step VI, convective heat transfer boundary conditions of the third kind may be respectively applied to inner and outer surfaces of the woven structural CMC turbine vane model, and periodic boundary conditions may be applied to upper and lower periodic structure surfaces, so as to perform the finite element calculation of the temperature field.

The present disclosure has the following beneficial effects over the prior art:

The present disclosure can establish a thermal analysis model for the CMC turbine vane based on the micro-woven structure of the CMC, and performs temperature field estimation based on the model, so as to make up for the defect of the homogenization thermal analysis method for distortion of temperature field fluctuation information, and improve the estimation accuracy of the temperature field of the woven structural CMC turbine vane.

DETAILED DESCRIPTION OF THE EMBODIMENTS

Figure 1:
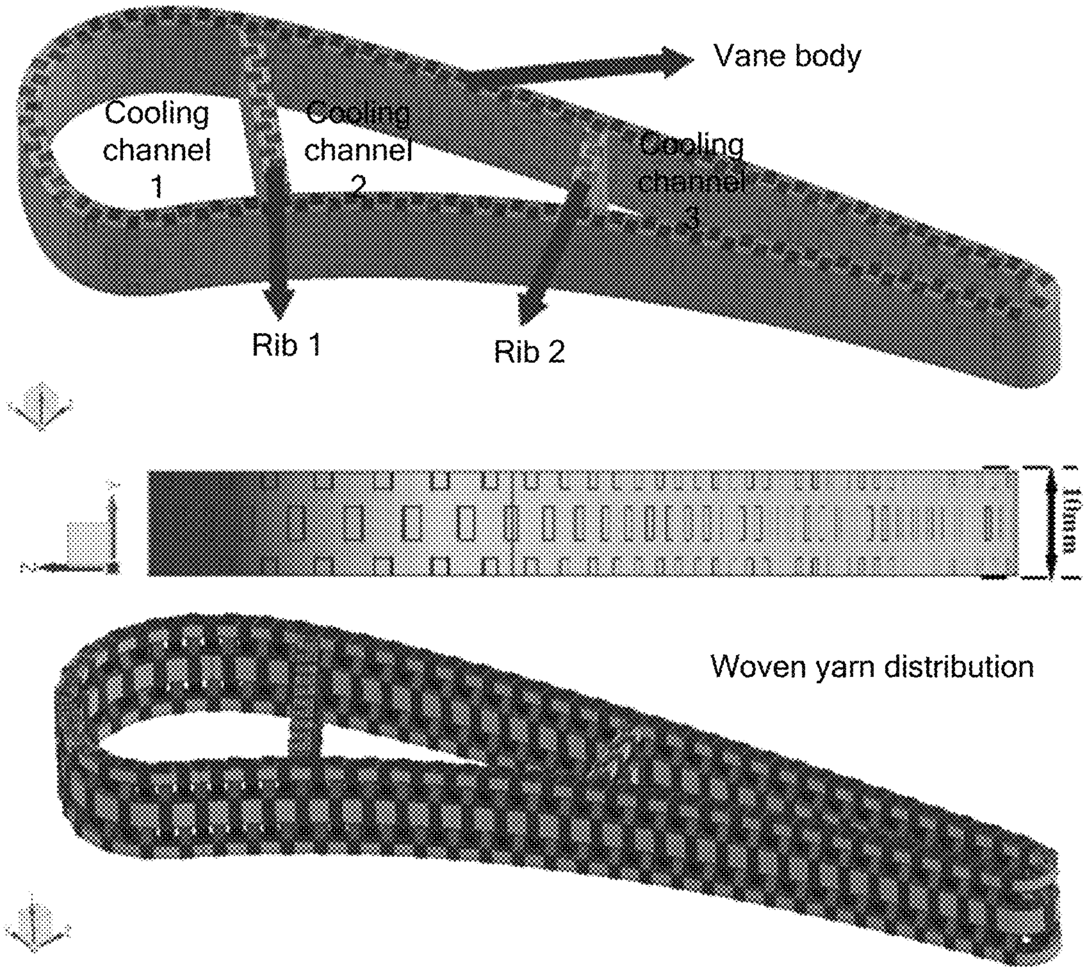
FIG. 1 is a turbine vane model of a CMC based on a micro-woven structure.

In view of the requirements of a thermal analysis method for a woven structural CMC turbine vane and considering the current thermal analysis for the CMC turbine vane, a homogenization method based on an anisotropic equivalent thermal conductivity is often used, which can better obtain regular characteristics of temperature field distribution of the CMC turbine vane. However, since the micro-woven structure is homogenized, the method cannot obtain fluctuation characteristics of a temperature field caused by the woven structure, and cannot meet the requirements of high-precision thermal analysis of the woven structural CMC turbine vane. Therefore, the present disclosure provides a thermal analysis method for a CMC turbine vane considering a micro-woven structure and a change of direction of fiber bundles, including the following steps.

Step I, geometric characteristics of the fiber bundles of the internal woven structure of the CMC are obtained based on an SEM. The geometric characteristics include section size characteristics and a fiber bundle spacing.

Step II, according to the geometric characteristics obtained in step I, combined with an actual thickness of the CMC turbine vane, a micro-model of warp yarns and weft yarns of the woven structure and a CMC matrix is established.

Step III, according to geometric periodic characteristics of the woven structure, a woven structural CMC turbine vane model with a micro-structure periodic width in a vane height direction is constructed. In the woven structural CMC turbine vane model, a direction of the warp yarns changes along the vane profile, and the weft yarns are woven around the warp yarns. First, a warp yarn section is swept along a characteristic line of the vane profile to establish warp yarn characteristics at different thickness positions, then a weft yarn section is interleaved around the warp yarns in the vane height direction, and a spacing between the warp yarn and the weft yarn is a fiber bundle spacing.

Step IV, for the woven structural CMC turbine vane model constructed in step III, an anisotropic thermal conductivity matrix varying with a vane profile is assigned. The anisotropic thermal conductivity matrix of the warp yarns and the weft yarns varies with space of the vane profile through curvilinear coordinates in a Comsol-Multiphysics software mathematics module, local curvilinear coordinates varying with the vane profile are set for the warp yarns and the weft yarns inside the vane, and then based on the curvilinear coordinates, an anisotropic thermal conductivity in three directions of a local area are assigned to characterize spatial variation characteristics of the anisotropic thermal conductivity matrix.

Step V, the woven structural CMC turbine vane model constructed in step III is meshed. Local mesh densification is performed in a dense area of the fiber bundles and an area at a junction of the fiber bundles and the CMC matrix.

Step VI, convective heat transfer boundary conditions of the third kind are respectively applied to inner and outer surfaces of the woven structural CMC turbine vane model, and periodic boundary conditions are applied to upper and lower periodic structure surfaces, so as to perform the finite element calculation of the temperature field.

Step VII, calculation results of the temperature field of the woven structural CMC turbine vane model are obtained, and compared with calculation results based on a homogenization thermal analysis method for an equivalent thermal conductivity for analysis, and fluctuation characteristics of the temperature field of the woven structural CMC turbine vane are extracted and analyzed.

The present disclosure is further described below with reference to embodiments and comparative examples.

EMBODIMENT

The present embodiment takes a C3X vane as an example. The vane is made of a 2.5D woven structure composite. The size of a single cycle of a woven structure is length×width×height=10×4.8×3.3 mm. The material fiber bundle has a width of 1.6 mm, and a thickness of 0.2 mm A spacing between weft yarns in a length direction is 2 mm, a spacing between warp yarns in a thickness direction is 0.6 mm, and a weaving angle is 34°. A woven structural turbine vane as shown in FIG. 1 is established. The vane has an axial chord length of 78 mm, and a circumferential chord length of 145 mm. The woven structure has a cycle length of 10 mm in a vane height direction (Y). The vane is composed of an annular vane body and straight ribs. The straight ribs 1 and 2 divide the interior of the vane into three internal cooling channels, and the ribs and the vane both have a thickness of 3.3 mm.

In view of the above woven structural CMC turbine vane model, a free tetrahedral mesh in Comsol-Multiphysics is used for meshing. A largest mesh element selected is 0.8 mm, a smallest element is 0.1 mm, a maximum growth rate is 1.45, and a curvature factor is 0.5. The mesh is refined in an area where a curvature of the woven structure changes greatly to avoid local twisting and inverted curved surface elements in the mesh. The final mesh amount of the woven structural vane is 10106385.

Figure 2:
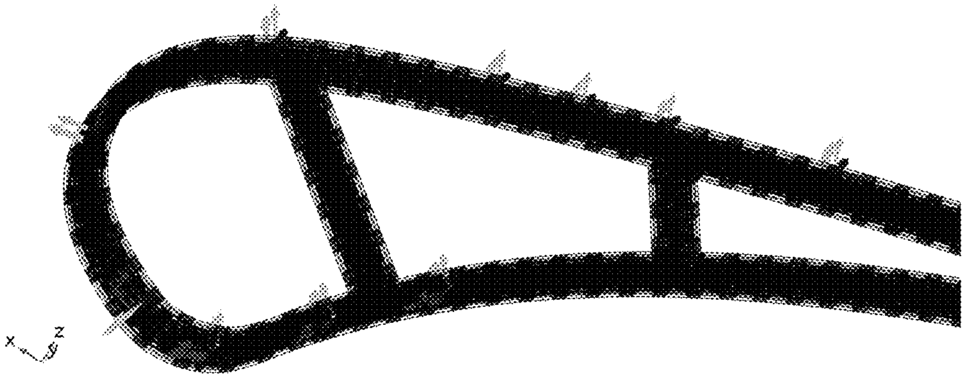
FIG. 2 is a distribution diagram of a local calculation coordinate system.

The woven structural vane contains 2696 different physical domains. In addition to the isotropic matrix, the woven yarn has obvious anisotropic characteristics, and the warp yarns and the weft yarns have different spatial distribution in the vane, resulting in a spatial deviation between the anisotropic thermal conductivity direction coordinate system of the warp yarns and the weft yarns and the calculation coordinate system, and main directions of the thermal conductivity of the warp yarns and the weft yarns need to be spatially converted to set the thermal conductivity. In the present embodiment, a local coordinate system varying with spatial distribution is set for the warp yarns and the weft yarns inside the vane body through curvilinear coordinates in a Comsol-Multiphysics mathematics module, as shown in FIG. 2. For the warp yarns and the weft yarns, only the thermal conductivity in three directions in the local coordinate system of their own needs to be given.

Figure 3:
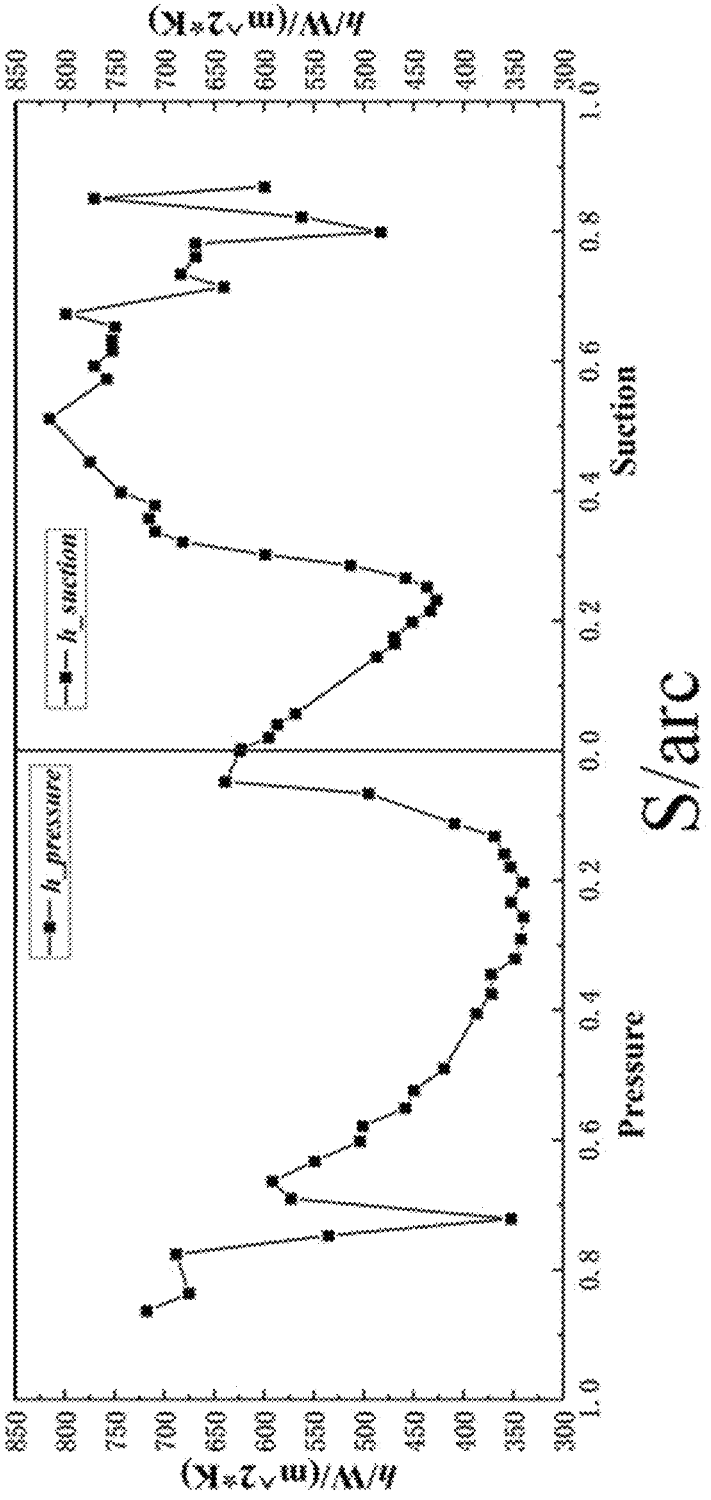
FIG. 3 shows distribution of a heat transfer coefficient on an outer surface of a vane.

Then boundary conditions of the third kind are applied to a surface of the vane for calculation, and reference may be made to experimental results of the working condition 4521 in the literature (L. D. Hylton, M. S. Mihelc, E. R. Turner, et al. Analytical and Experimental Evaluation of the Heat Transfer Distribution Over the Surfaces of Turbine Vane[R]. America: National Aeronautics and Space Administration NASA Lewis Research Center, 1983:1-225). The experimental data of an outer surface of the vane under this working condition is selected as a heat transfer coefficient of the outer contour of the woven structural CMC turbine vane, as shown in FIG. 3. FIG. 3 shows distribution of the heat transfer coefficient on a suction surface and a pressure surface respectively, where the abscissa is a ratio of a distance from a point on the suction surface (or pressure surface) to a leading edge and an entire arc length of the suction surface (or pressure surface), and the ordinate is the heat transfer coefficient. According to the previous section, when the spatial distribution of the thermal conductivity of the homogenized vane in the calculation coordinate system is solved, expressions of the suction surface and the pressure surface are fit, and a point corresponding to the experimental data on an outer contour line is obtained by solving the curvilinear integral and the value of the point is assigned. For the area where no experimental data is given, heat transfer coefficients at front and back ends of the area are used for linear interpolation, and finally the distribution of the heat transfer coefficient on the entire outer contour of the vane is obtained. The above work is completed in Matlab to obtain an equation file of the heat transfer coefficient of the outer contour, which can called by the Comsol link with Matlb module and used as an external heat transfer boundary condition. The temperature of the outer contour is a mainstream inlet temperature, and is 818 K.

The vane is constructed based on the shape of the C3X vane. The internal cooling channel of the vane is divided into three cooling channels by the ribs, which are respectively marked as a cooling channel 1, a cooling channel 2, and a cooling channel 3. Specific values of the wall heat transfer coefficient and the corresponding gas temperature are summarized in Table 1:

TABLE 1

Heat transfer boundary conditions of internal cooling channel of woven structural vane

| Cooling channel 1 | | Cooling channel 2 | | Cooling channel 3 | |
|---|---|---|---|---|---|
| Temperature-(K) | Heat transfer coefficient (W/($m^2 \cdot k$)) | Temperature-(K) | Heat transfer coefficient (W/($m^2 \cdot k$)) | Temperature-(K) | Heat transfer coefficient (W/($m^2 \cdot k$)) |
| 335 | 439.5 | 330 | 550 | 350 | 860.8 |

COMPARATIVE EXAMPLE

Figure 4:
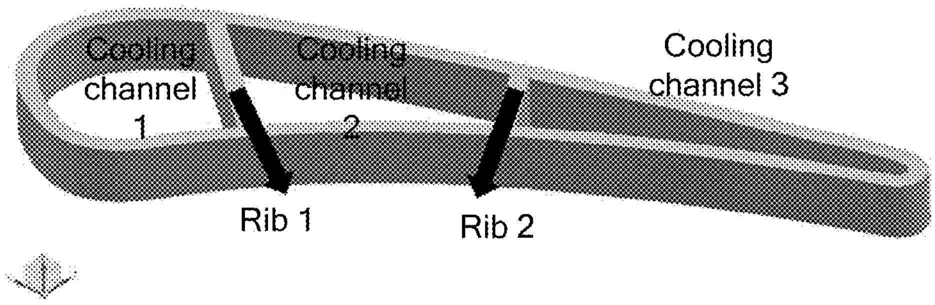
FIG. 4 is a homogenized vane model based on an equivalent thermal conductivity.

In order to compare the difference between the thermal analysis model established by the present disclosure and the homogenization thermal analysis model based on the equivalent thermal conductivity for analysis, a homogenized vane model as shown in FIG. 4 is also established here using a numerical method in the literature (Z. Tu, J. K. Mao, H. Jiang, et al. Numerical method for the thermal analysis of a ceramic matrix composite turbine vane considering the spatial distribution of the anisotropic thermal conductivity, Applied Thermal Engineering, 2017, 127:436-452) to obtain a homogenized temperature field of a woven structural CMC turbine vane.

Figure 5:
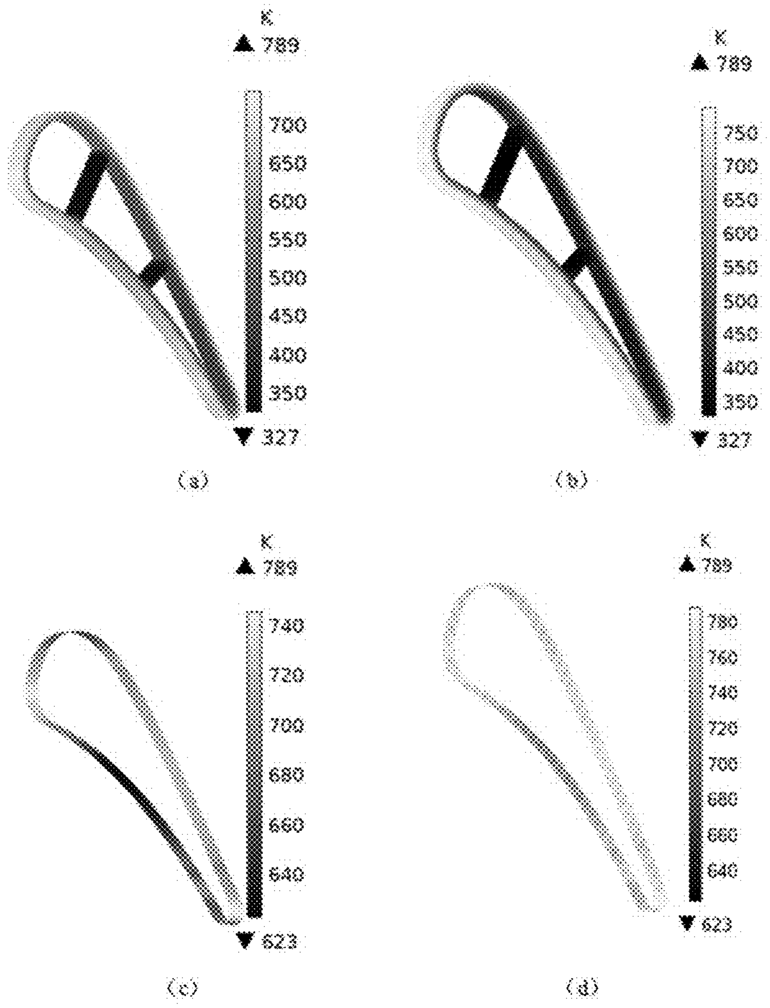
FIG. 5 shows vane temperature distribution, where (a) is a homogenized vane; (b) is a woven structural vane; (c) is an outer surface of the homogenized vane; and (d) is an outer surface of the woven structural vane.

FIG. 5 shows a schematic diagram of temperature distribution of the homogenized vane and the woven structural vane. It can be seen from FIG. 5 that the woven structural vane has an overall temperature significantly higher than that of the homogenized vane, and the temperature field distribution on the surface of the homogenized vane is relatively uniform. From the temperature distribution on the outer surface of the vane, it can be further seen that the surface temperature of the woven structural vane has obvious temperature fluctuation characteristics, the temperature is alternately distributed with the woven structure, and the two vanes have the maximum and minimum temperature at the same position on the outer surfaces. However, the temperature is very different. The maximum surface temperature of the woven structural vane is 42.683 K higher than that of the homogenized vane. The difference between the minimum temperature of the two is 72.631 K, which is significant.

Figure 6:
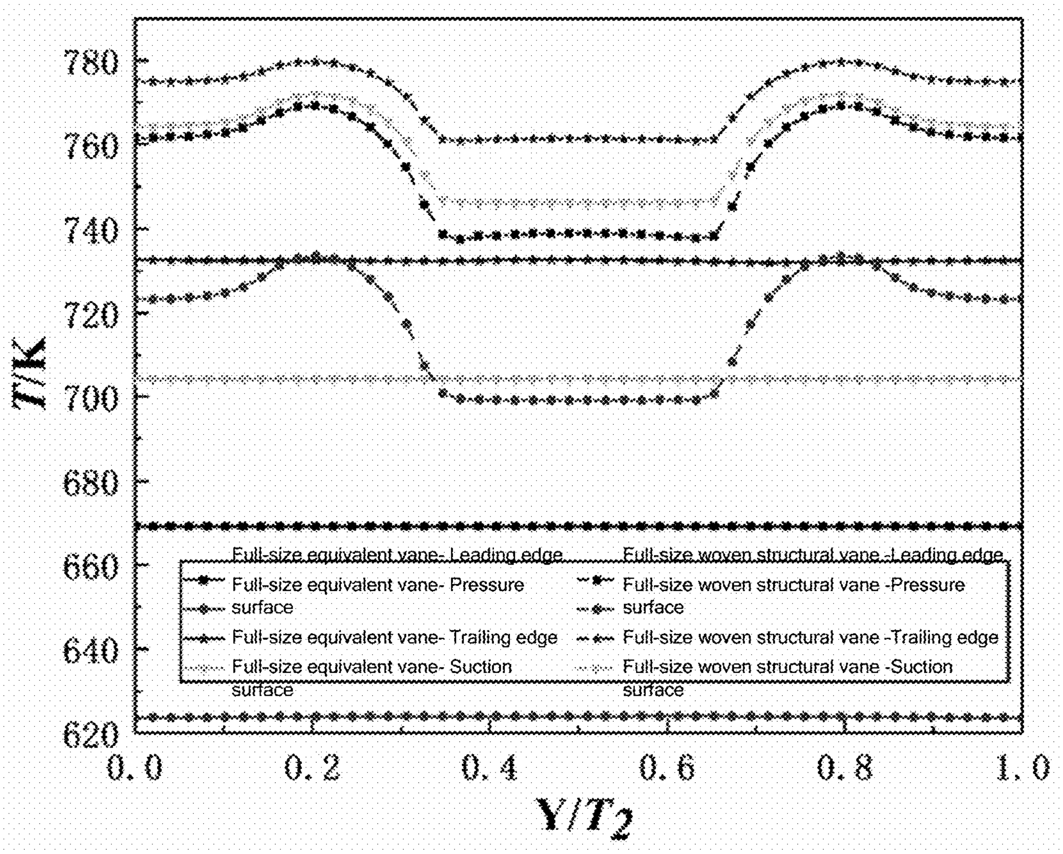
FIG. 6 is a comparison diagram of temperature distribution on characteristic lines of two models of the woven structural vane and the homogenized vane.

FIG. 6 shows temperature distribution of the homogenized vane and the woven structural vane on characteristic lines of the leading edge, suction surface, pressure surface, and trailing edge of the vane in the vane height direction. Both ends of the characteristic line pass through a matrix area and the middle passes through a woven area. From FIG. 6, it can be more clearly found that the temperature of the woven structural vane is overall higher than that of the homogenized vane. The temperature of the homogenized vane in the vane height direction is basically unchanged, while the temperature on the characteristic line of the woven structural vane is high at both ends and low in the middle. The temperature fluctuation is obvious. Further analysis of the data on the characteristic line shows that the minimum difference between the average temperature on the characteristic line of the homogenized vane and the average temperature on the characteristic line of the woven structural vane is 38.7 K, and the maximum difference between the average temperature is as high as 93.3 K. The maximum temperature change of the woven structural vane on the characteristic line is close to 35 K, and the maximum amplitude of temperature fluctuation on the characteristic line also exceeds 18 K, which has significant inhomogeneity and severe temperature fluctuation.

Therefore, compared with the comparative example, the embodiment can more accurately obtain the temperature field fluctuation information of the turbine vane caused by the material woven structure, and further improve the simulation accuracy of the woven structural CMC turbine vane.

The foregoing descriptions are only preferred implementations of the present disclosure. It should be noted that several improvements and modifications may further be made by a person of ordinary skill in the art without departing from the principle of the present disclosure, and such improvements and modifications should also be deemed as falling within the protection scope of the present disclosure.

What is claimed is:

1. A computer-implemented thermal analysis method for a ceramic matrix composite (CMC) turbine vane considering a micro-woven structure and a change of direction of fiber bundles, comprising:

step I, obtaining geometric characteristics of the fiber bundles of the internal woven structure of the CMC based on a scanning electron microscope (SEM), wherein the geometric characteristics comprise section size characteristics and a fiber bundle spacing;

step II, according to the geometric characteristics obtained in step I, combined with an actual thickness of the CMC turbine vane, establishing a micro-model of warp yarns and weft yarns of the woven structure and a CMC matrix;

step III, according to geometric periodic characteristics of the woven structure, constructing a woven structural CMC turbine vane model with a micro-structure periodic width in a vane height direction;

step IV, for the woven structural CMC turbine vane model constructed in step III, assigning an anisotropic thermal conductivity matrix varying with a vane profile;

step V, meshing the woven structural CMC turbine vane model constructed in step III;

step VI, performing finite element calculation of a temperature field on the woven structural CMC turbine vane model; and step VII, obtaining calculation results of the temperature field of the woven structural CMC turbine vane model, comparing the calculation results with calculation results based on a homogenization thermal analysis method for an equivalent thermal conductivity for analysis, and extracting and analyzing fluctuation characteristics of the temperature field of the woven structural CMC turbine vane.

2. The computer-implemented thermal analysis method for a CMC turbine vane considering a micro-woven structure and a change of direction of fiber bundles according to claim 1, wherein in step III, in the woven structural CMC turbine vane model, a direction of the warp yarns changes along the vane profile, and the weft yarns are woven around the warp yarns.

3. The computer-implemented thermal analysis method for a CMC turbine vane considering a micro-woven structure and a change of direction of fiber bundles according to claim 1, wherein in step IV, the anisotropic thermal conductivity matrix of the warp yarns and the weft yarns varies with space of the vane profile through curvilinear coordinates in a Comsol-Multiphysics software mathematics module, local curvilinear coordinates varying with the vane profile are set for the warp yarns and the weft yarns inside the vane, and then based on the curvilinear coordinates, an anisotropic thermal conductivity in three directions of a local area are assigned to characterize spatial variation characteristics of the anisotropic thermal conductivity matrix.

4. The computer-implemented thermal analysis method for a CMC turbine vane considering a micro-woven structure and a change of direction of fiber bundles according to claim 1, wherein in step V, local mesh densification is performed in a dense area of the fiber bundles and an area at a junction of the fiber bundles and the CMC matrix.

5. The computer-implemented thermal analysis method for a CMC turbine vane considering a micro-woven structure and a change of direction of fiber bundles according to claim 1, wherein in step VI, convective heat transfer boundary conditions of the third kind are respectively applied to inner and outer surfaces of the woven structural CMC turbine vane model, and periodic boundary conditions are applied to upper and lower periodic structure surfaces, so as to perform the finite element calculation of the temperature field.

6. The computer-implemented thermal analysis method for a CMC turbine vane considering a micro-woven structure and a change of direction of fiber bundles according to claim 2, wherein step III comprises: first sweeping a warp yarn section along a characteristic line of the vane profile to establish warp yarn characteristics at different thickness positions, and then interleaving a weft yarn section around the warp yarns in the vane height direction, wherein a spacing between the warp yarn and the weft yarn is a fiber bundle spacing.

* * * * *